United States Patent
Morales

(10) Patent No.: US 11,023,653 B2
(45) Date of Patent: *Jun. 1, 2021

(54) SIMPLIFIED FORMATTING FOR VARIABLE DATA PRODUCTION WITH VERTICAL RESOLUTION OF DEPENDENCIES

(71) Applicant: KYOCERA DOCUMENT SOLUTIONS INC., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,673

(22) Filed: Oct. 17, 2018

(65) Prior Publication Data

US 2020/0125628 A1   Apr. 23, 2020

(51) Int. Cl.
*G06F 40/103* (2020.01)
*G06F 40/186* (2020.01)
*G06F 40/14* (2020.01)
*H04N 1/00* (2006.01)
*G06F 3/12* (2006.01)

(52) U.S. Cl.
CPC ............ *G06F 40/103* (2020.01); *G06F 40/14* (2020.01); *G06F 40/186* (2020.01); *G06F 3/127* (2013.01); *G06F 3/1208* (2013.01); *H04N 1/00188* (2013.01)

(58) Field of Classification Search
CPC .............................. G06F 3/1243; G06F 17/24
See application file for complete search history.

(56) References Cited

U.S. PATENT DOCUMENTS

| | | | | |
|---|---|---|---|---|
| 5,845,303 | A * | 12/1998 | Templeman | ........ G06F 17/2264 715/255 |
| 6,826,727 | B1 * | 11/2004 | Mohr | ..................... G06F 17/211 382/180 |
| 7,142,326 | B2 | 11/2006 | Bondy et al. | |
| 9,424,236 | B2 * | 8/2016 | Sullivan | .................. H04L 67/42 |
| 9,875,228 | B1 * | 1/2018 | Hall | ........................ G06F 17/246 |
| 10,325,012 | B2 * | 6/2019 | Sullivan | .................. G06F 40/58 |
| 10,417,204 | B2 * | 9/2019 | Edwards | ................. G06F 16/22 |
| 2005/0168780 | A1 * | 8/2005 | Kobashi | ................ G06F 17/248 358/1.18 |

(Continued)

OTHER PUBLICATIONS

U.S. Appl. No. 16/162,675, filed Oct. 17, 2018, Morales.

*Primary Examiner* — Scott T Baderman
*Assistant Examiner* — Benjamin Smith
(74) *Attorney, Agent, or Firm* — Sheridan Ross P.C.

(57) ABSTRACT

According to one embodiment, a method for formatting variable data production of a document can comprise defining, by a document production system, a set of rules. The set of rules can comprise one or more of a derived rule, a matching rule, or a formatting rule associated with one or more data objects of the document. The set of rules can be applied to the associated one or more data objects of the document based on dependencies between the rules in the set of rules. The dependencies between the rules in the set of rules are resolved in a hierarchically vertical manner. One or more custom documents can be generated based on the applied set of rules.

17 Claims, 4 Drawing Sheets

(56) References Cited

U.S. PATENT DOCUMENTS

| | | | |
|---|---|---|---|
| 2006/0031762 A1* | 2/2006 | Takashima | G06F 17/212 715/246 |
| 2006/0080081 A1* | 4/2006 | Menninga | G06F 17/211 704/4 |
| 2006/0155699 A1* | 7/2006 | Purvis | G06Q 10/10 |
| 2006/0179405 A1* | 8/2006 | Chao | G06F 40/186 715/209 |
| 2006/0200759 A1* | 9/2006 | Agrawala | G06F 40/103 715/209 |
| 2007/0002377 A1* | 1/2007 | Tokunaga | G06F 40/166 358/1.18 |
| 2007/0022003 A1* | 1/2007 | Chao | G06Q 30/02 705/14.46 |
| 2007/0174760 A1* | 7/2007 | Chamberlain | G06F 17/246 715/220 |
| 2007/0233709 A1* | 10/2007 | Abnous | G06F 16/289 |
| 2008/0120536 A1* | 5/2008 | Osaka | G06F 17/217 715/244 |
| 2008/0282147 A1* | 11/2008 | Schorr | G06F 17/212 715/247 |
| 2009/0161916 A1* | 6/2009 | Ma | G06K 9/00442 382/112 |
| 2012/0278700 A1* | 11/2012 | Sullivan | G06F 9/44 715/235 |
| 2013/0019165 A1* | 1/2013 | Whetsell | G06F 40/166 715/249 |
| 2013/0298013 A1* | 11/2013 | Hunter | G06F 40/137 715/243 |
| 2014/0040730 A1* | 2/2014 | Prasad | G06F 17/211 715/249 |
| 2014/0281928 A1* | 9/2014 | Tkach | G06F 8/38 715/243 |
| 2016/0275052 A1* | 9/2016 | Eicholz | G06F 40/103 |
| 2016/0299925 A1* | 10/2016 | Edwards | G06F 9/543 |
| 2016/0342576 A1* | 11/2016 | Sullivan | G06F 40/154 |
| 2017/0315967 A1* | 11/2017 | Boucher | G06F 11/3476 |
| 2018/0074999 A1* | 3/2018 | Cogan | G06F 3/147 |

\* cited by examiner

SIMPLIFIED FORMATTING FOR VARIABLE DATA PRODUCTION WITH VERTICAL RESOLUTION OF DEPENDENCIES

FIELD OF THE DISCLOSURE

Embodiments of the present disclosure relate generally to methods and systems for formatting variable data production of a document and more particularly to defining and using formatting rules in variable data composition for the document.

BACKGROUND

Variable data production refers to the process of producing content in which elements of that content vary for each recipient, e.g., a document such as an electronic or printed advertisement or other communication targeted to or customized for an individual recipient. The process of defining conditional formatting for variable data production has grown in complexity as variable data production has become more sophisticated. Variable data production systems have evolved from implementations in which formatting is directly defined by source data to implementations that may evaluate many conditional formatting rules against multiple data sources to determine both the content and the formatting of variable objects.

For example, a variable data production system may evaluate the following recipient information when placing an image of a car in a postcard: age (with 5 variations, for example); income (with 4 variations, for example); geography (with 6 variations, for example); and community (with 4 variations, for example). Using even this limited example, a variable data application may offer up to 480 variations of the same document. To enable composition, the user must enter rules for all required variations as part of the image selection configuration. In addition, to ensure all variations are visually coherent, the user will need to define rules for formatting other objects in the document (e.g., additional images; colors for backgrounds, text and vector objects; font selection; etc.). If the user chooses to create 20 variations of the document and there are 5 variable objects then the user must configure 100 conditional formatting rules. Sophisticated marketing campaigns will use much more data and will personalize more than a handful of objects on the page. As such, there is a need for improved methods and systems to streamline the configuration of conditional formatting for variable data composition.

BRIEF SUMMARY

According to one embodiment, a method for formatting variable data production of a document can comprise defining, by a document production system, a set of rules. The set of rules can comprise one or more of a derived rule, a matching rule, or a formatting rule associated with one or more data objects of the document. The set of rules can be applied to the associated one or more data objects of the document based on dependencies between the rules in the set of rules. The dependencies between the rules in the set of rules are resolved in a hierarchically vertical manner. One or more custom documents can be generated based on the applied set of rules.

According to another embodiment, a system can comprise a processor and a memory coupled with and readable by the processor. The memory can store therein a set of instructions which, when executed by the processor, causes the processor to format variable data production of a document by defining a set of rules. The set of rules can comprise one or more of a derived rule, a matching rule, or a formatting rule associated with one or more data objects of the document. The set of rules can be applied to the associated one or more data objects of the document based on dependencies between the rules in the set of rules. The dependencies between the rules in the set of rules are resolved in a hierarchically vertical manner. One or more custom documents can be generated based on the applied set of rules.

According to yet another embodiment, a non-transitory, computer-readable medium can comprise a set of instructions stored therein which, when executed by a processor, causes the processor to format variable data production of a document by defining a set of rules. The set of rules can comprise one or more of a derived rule, a matching rule, or a formatting rule associated with one or more data objects of the document. The set of rules can be applied to the associated one or more data objects of the document based on dependencies between the rules in the set of rules. The dependencies between the rules in the set of rules are resolved in a hierarchically vertical manner. One or more custom documents can be generated based on the applied set of rules.

Figure 1:
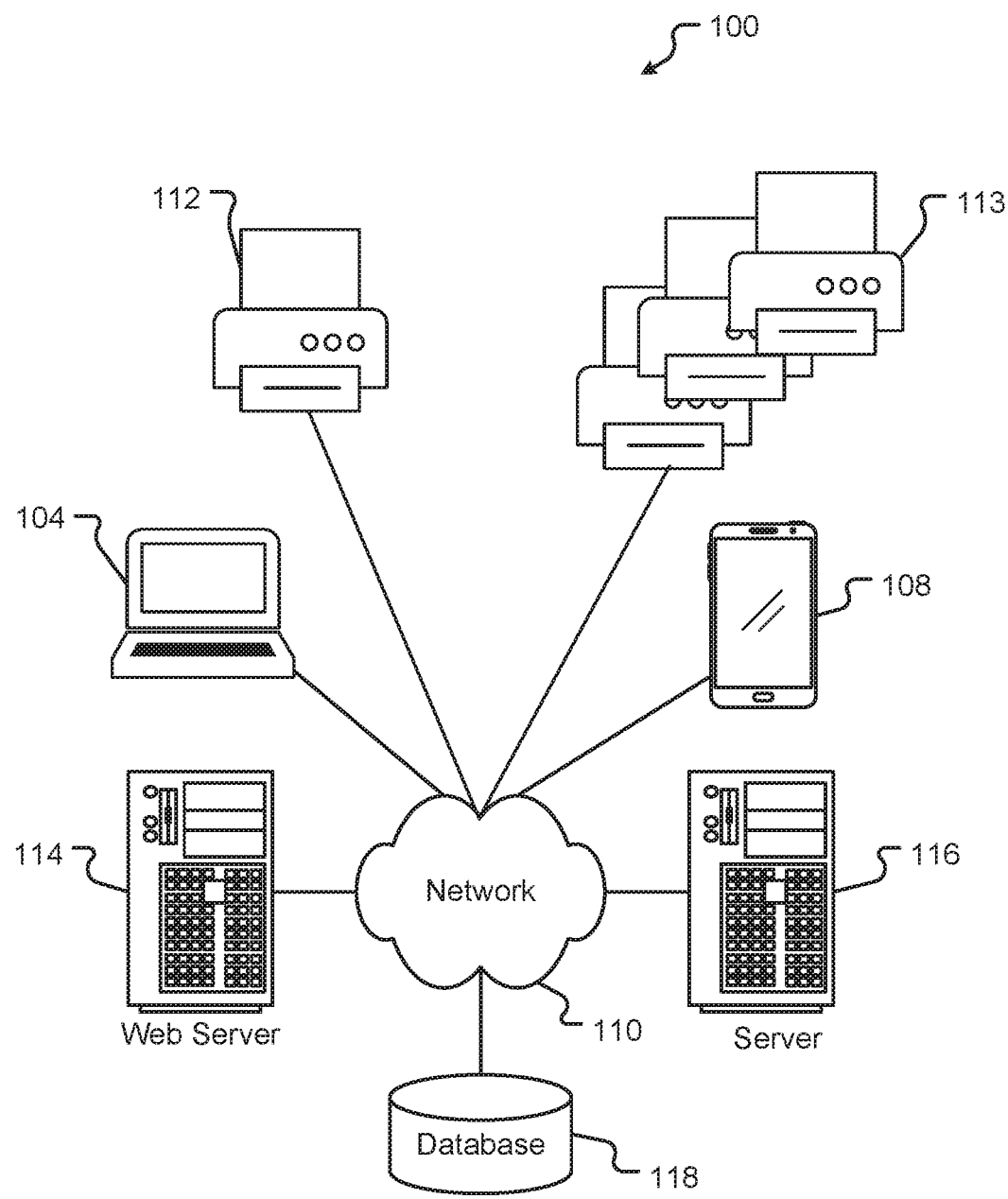
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "variable data production" as used herein refers to the process of producing content in which elements of the content can vary for each recipient.

The term "variable data composition" as used herein refers to the process of generating the variable content.

The term "variable data printing" as used herein refers to variable data production in which the final output is printed documents.

The term "variable data publishing" as used herein refers to variable data production in which the final output is delivered electronically (e.g., as PDFs, microsites (web sites), email, SMS, etc.).

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices 104, 108, and 112, such as a computing device 104, a mobile device 108, a Multi-Function Printer (MFP) 112 and/or a digital press. The computing devices, such as computing device 104, may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. The computing devices 104, 108, and 112 may also have any of a variety of applications, including for example, database client and/or server applications, and web browser applications. Additionally, or alternatively, the computing devices, such as mobile device 108 may be any other electronic device, such as a thin-client computer, Internet-enabled mobile telephone, and/or personal digital assistant, capable of communicating via a network 110 and/or displaying and navigating web pages or other types of electronic documents. MFP 112 can comprise any of a variety of devices offering printing, scanning, copying, faxing, and/or other functions of processing documents. Examples of such devices can include, but are not limited to, the ECOSYS line of MFPs provided by KYOCERA Document Solutions Inc. Digital press 113 can comprise any of a variety of one or more devices offering printing on a variety of substrates and/or other functions of processing documents. Although the exemplary computer environment 100 is shown with three computing devices, any number of user computers or computing devices may be supported.

Environment 100 further includes a network 110. The network 110 can be any type of network familiar to those skilled in the art that can support data communications using any of a variety of commercially-available protocols, including without limitation SIP, TCP/IP, SNA, IPX, AppleTalk, and the like. Merely by way of example, the network 110 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish available operations as one or more web services.

The environment 100 may also include one or more file and/or application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server(s) 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 114 and/or 116 may also include database servers, including without limitation those commercially available from Oracle®, Microsoft®, Sybase®, IBM® and the like, which can process requests from database clients running on a computing device 104, 108, 112.

The web pages created by the server(s) 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer devices 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
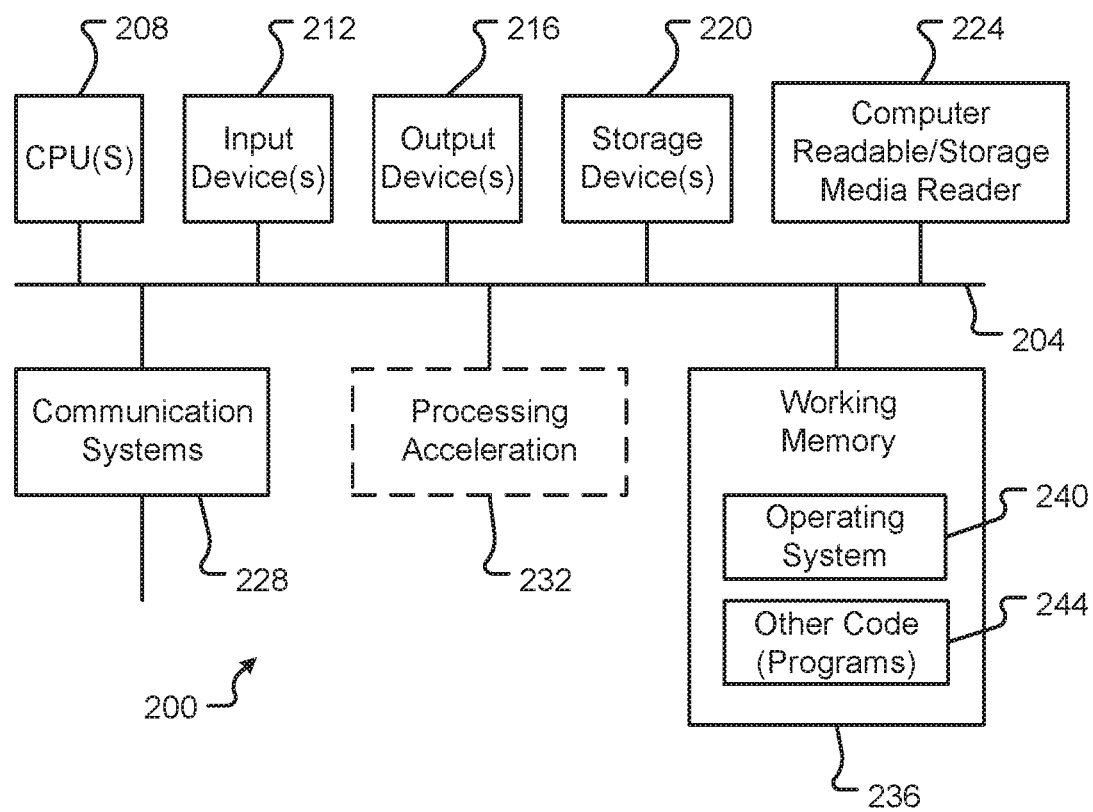
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices 104, 108, and 112, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
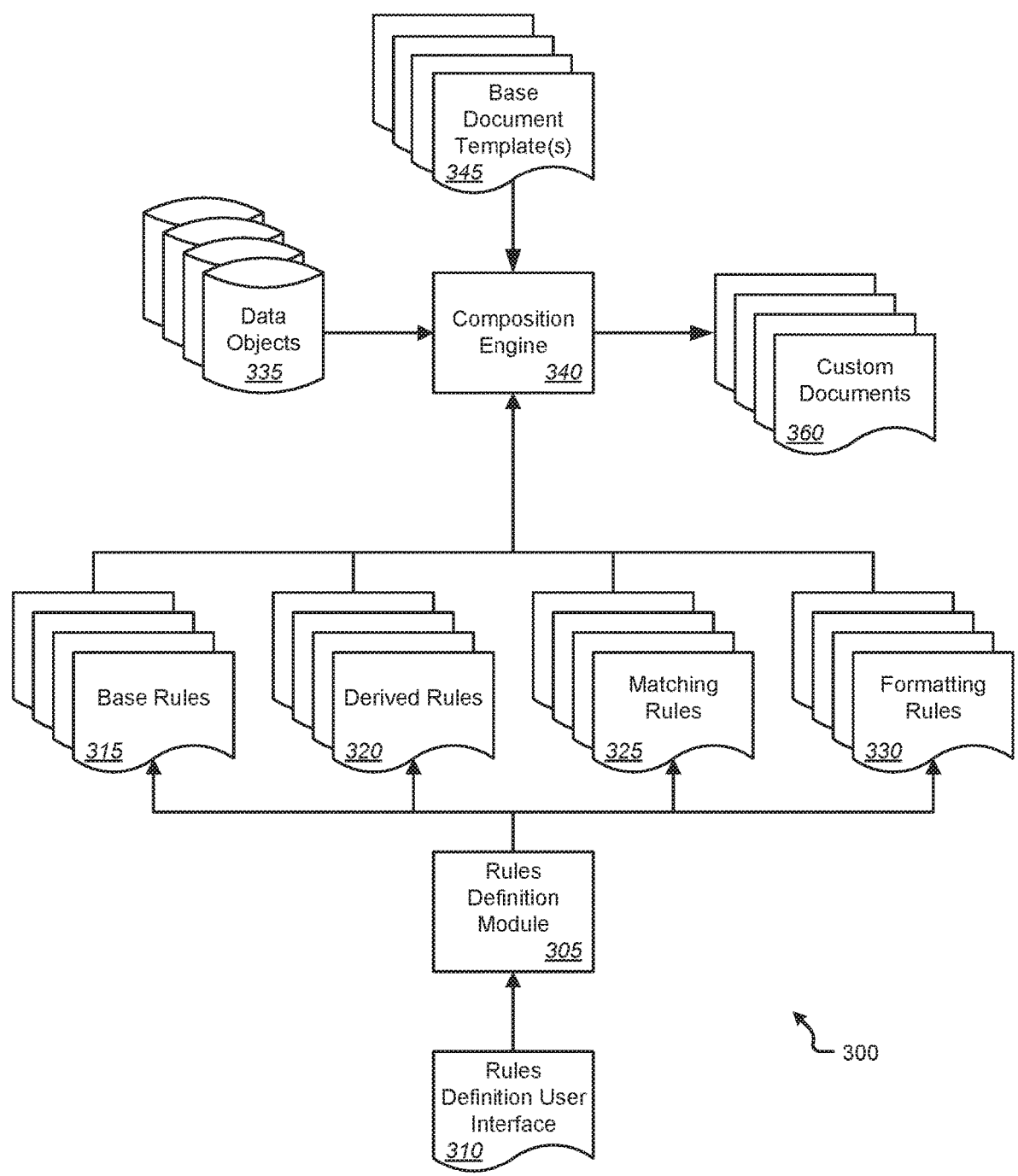
FIG. 3 is a block diagram illustrating elements of an exemplary document production system according to one embodiment of the present disclosure.

FIG. 3 is a block diagram illustrating elements of an exemplary document production system according to one embodiment of the present disclosure. A document production system 300 can comprise any one or more of an application server, web server, or other server or other computer or computing device as described above executing instructions to perform the functions as will be described herein. As illustrated in this example, the document production system 300 can include a rules definition module 305 to facilitate the definition of a set of rules 315-330 for use in variable data production as will be described. The rules definition module 305 can generate and present a rules definition user interface 310 such as a textual, graphical, and/or other interface through which a user may interact with the rules definition module 305 and document production system 300 to select, specify, and/or otherwise define the set of rules 315-330.

Generally speaking, the set of rules can comprise one or more base formatting rules 315, one or more derived rules 320, one or more matching rules 325, and/or one or more formatting rules 330. In most basic terms, rules can comprise executable instructions or statements that define one or more conditions and corresponding one or more actions to be performed upon the satisfaction of those conditions. Base formatting rules 315 are akin to traditional rules for variable data production and can comprise expressions (e.g. if, elseif, else statements) associated with objects of a document and which the document production system 300 evaluates to generate personalized content. Derived rules 320 can be associated with data objects of the document and can use, in whole or in part, the results from evaluating other rules, e.g., base formatting rules or other derived rules, as input. Matching Rules 325 can comprise rules that use object properties to select objects to which the rule will apply. Formatting rules 330 can comprise rules that apply different formatting to different classes of objects.

More specifically, the user can, though the rules definition user interface 310 and rules definition module 305, define base formatting rules 315 for objects of a document. These base formatting rules 315 can evaluate source data objects 335 to define formatting for the objects when added to the document. Formatting defined by the base formatting rules 315 can include, but is not limited to, any one or more of: font properties such as family, size, color, style, weight, shadow, etc.; paragraph properties such as leading, horizontal and vertical alignment, hyphenation, spacing, etc.; fill properties such as color, opacity, blending mode, pattern, gradation, shadow, etc.; stroke properties such as color, opacity, blending mode, pattern, gradation, shadow, format, etc.; image properties such as file, opacity, blending mode, alpha mask, etc.; and/or others.

The user can also define one or more derived rules 320 through the rules definition user interface 310 and rules definition module 305 by associating the formatting of an object with the formatting of another object. The user can, through the derived rules 320, associate the formatting of an object with either static formatting of another object or with the formatting of another variable object. In addition, the user may define relationships between the formatting of the source object and the formatting of the target object.

For example, a derived rule 320 can be defined for the property "color" and the relationship "match." In this example, the user can define base formatting rules 315 for formatting the fill in "vector object a." The user can also specify through a derived rule 320 that the stroke color of "vector object b" match the fill color of "vector object a." Later, during composition, the composition engine 340 can ascertain the fill color for "vector object a" and apply the same color to the stroke of the "vector object b."

In another example, a derived rule 320 can be defined for the property "color" and the relationship "monochromatic." In this example, the user can define base formatting rules 315 for formatting the text color. The user can also specify, through a derived rule 320, that the stroke of a different object color match the text color at a 50% tint. During composition, the composition engine 340 can ascertain the text color and apply a 50% tint of the same color to the stroke.

In another example, a derived rule 320 can be defined for the property "color" and the relationship "split complimentary." In this example, the user can define a base formatting rule 315 for formatting vector fill for "object a." The user can also specify through a derived rule 320 that the fill of a different object color have a spit complimentary association with the fill of "object a." The user can further define whether to use the counterclockwise or clockwise color. During composition, the composition engine 340 can ascertain the vector fill color for "object a" and find the split complimentary color for the fill color for "object a" and then select the specified color. It should be noted that derived rules 320 can be defined for relationships between properties of two different objects as well as relationships between different properties of the same object.

According to one embodiment, when the user defines a derived rule 320, additional settings can be specified by the rule 320. For example, a derived rule 320 can be defined through the rules definition module 305 to specify or identify a source object, e.g., based on the user manipulating the rules definition user interface 310 to select or identify an object. Similarly, a source object property can be defined in a derived rule 320 through the rules definition module 305 to specify which properties to apply, e.g., based on a user selection from a list of all source object properties presented through the rules definition user interface 310. The selected properties can be transferred to the target object by the composition engine 340 during composition as will be described below. Examples of these properties can include, but are not limited to: any object properties such as style; vector properties such as fill, stroke color, stroke blend mode, stroke transparency, stroke feathering, stroke shadows (drop, inner, outer, etc.), stroke gradient, or fill pattern; text properties such as color, transparency, gradient, variation (bold, italic, small caps, all caps, weight, etc.), style (underline, outline, strike trough, super/subscript, etc.), or decoration (shadow, highlight, etc.); and/or image properties such as transparency, blend mode, color (1 bit colorized, RGB or CMYK derived color), and/or alpha mask (e.g. gradient).

Additionally, a derived rule 320 can define a relationship between a source object and target object and which can be used to control how the selected property is transferred to the target object. This relationship can be defined as a "match" which can apply to any property and transfers the property from the source object to the target object. In other cases, the relationship may be defined in terms of a numeric relationship. This may apply, for example, to font size, transparency percentage, paragraph spacing, leading or other properties whose values are numeric. A numeric relationship may also define a multiplier to apply to a source value, e.g., 1.0 would match the source value whereas 0.5 would make the value half the source value, and/or thresholds to map specific formatting to a range for the source value. In yet other cases, relationships may be defined in terms of a color relationship. For example, the user may specify a standard color relationship such as monochromatic, analogous, complimentary, split complimentary, triadic, tetradic, etc. Specific color relationships may include additional options. For example, the user may define use of a specific color for an analogous relationship (e.g. CW1—the first counterclockwise color). In addition, the user may elect to override the lightness of the selected color. In that case, the color relationship may only define the hue. The lightness may be defined statically or may be defined using a different set of rules. An image color relationship can be used. The system derives the source color from an image. The user may define additional color selection constraints such as ignore white/black, prefer saturated colors, prefer brighter colors, etc. Once a color is derived this definition can function in the same manner as the color relationship. An image color relationship may also derive a source palette from an image. The user may define color relationships from the primary, secondary, tertiary, quaternary, quinary, etc. colors from the palette.

According to one embodiment, the user may use derived rules 320 within rule sets that include base formatting rules 315. For example, a rule may be defined as:

if (gender=m) set text color to blue
    else if (gender=f) set text color to pink
    else set text color to match fill of object x Similarly, the rule set may evaluate base formatting rules 315 and derived rules 320 to select which rules to apply to an object. For example (evaluating the output of the example above):

if (text color is not blue or pink) set vector fill to complimentary color of object x else set vector fill to text color Furthermore, formatting for an object may be partially controlled by different sets of rules. For example, an object may use a rule set for the fill color and a rule for the decoration. For example:

Rule Set 1:
      if (gender=m) set text color to blue
      else if (gender=f) set text color to pink
      else set text color to match fill of object x
    Rule 2:
      set text decoration to object y Unlike base formatting rules 315 and derived rules 320, matching rules 325 are not associated with a specific object. Instead, they define a set of properties which are used to select the objects that will be formatted based on the formatting rules 330. Aside from the object selection rules, these rules can operate in the same manner as base formatting rules 315 and derived rules 320. The user may define a matching rule 325 in a couple of different ways. For example, the user may add a rule and specify which of the source object properties (per above) to use when selecting objects for formatting. For example:

select if (Text Style="Heading1")
    define formatting rules per above

Alternatively, the user may select an object on the document and elect to specify a new matching rule for similar objects. The user can be presented through the rules definition user interface 310 with a list of object properties so they can specify which properties to use for the matching rule. For example, the user may select a text box in the rules definition user interface 310 to indicate:

select if (text color=white and ((fill color is not none) and (fill color is not white))) define formatting rules per above When the user defines a matching rule 325, they can be provided through the rules definition user interface 310 the option to preview content selections in their document. When this option is selected, the user interface 310 can highlight the content objects that match the defined rule. The user can then be provided through the user interface 310 the option to include or exclude specific objects from the matching rule 325.

A third alternative for defining a matching rule 325 can be for the user to manually select multiple objects through the user interface 310 before specifying either base formatting rules 315 or derived formatting rules 320. In this case, the matching rule 325 can be defined based on the common selection and can contain the identifiers of the selected objects.

Matching rules 325 may be complimented by formatting rules 330. These are rules which apply different formatting to objects of different types. For example, the user may define the following selection criteria:

select if ((object is image) and (image color space is not 1 bit)) or (object is vector)

The above selection will mean that the rules will apply to two inherently different kinds of objects. For example, the user can define more than one set of formatting rules such as:

```
if (gender = m) {
    if (object = image) to boy-short.jpg
    if (object = vector) fill color to "Red"
}
else if (gender = f) {
    if (object = image) file to girl-shirt.jpg
    if (object = vector) fill color to "Light Blue"
}
```

The formatting criteria may include the object type but may also include any other property known to the system (as listed above). For example:

set
      if (text size>14) to Helvetica-Bold, Red
      if (text size<15) to Helvetica, Black It should be noted and understood that, while the selections described here are textual or text-based, these selections are offered by way of example only and are not intended to limit the scope of the present disclosure. In other implementations, the user can be presented with a graphical interface, or a combination of a graphical interface with textual elements, through which selections can be made. For example, to define a color relationship the user may select the type of color relationship through elements of the interface and then be presented with a picture of that relationship. They may then select one of the colors using the graphical representation.

Once the rules 315-330 have been defined, a composition engine 340 can evaluate and apply the rules 315-330 to a set of available data objects 335 and one or more templates 345. As known in the art, in VPD composition, the templates 345 can comprise a base document which will be personalized. The set of templates 345 can comprise a single template representing a single base document or can comprise a plurality of templates representing different base documents for different types of communications or communication channels. For example, templates can be separately defined for micro websites, email, content pushed to mobile apps, printed materials, and others.

According to one embodiment, composition using the data objects 335 and templates 345 can be performed by the composition engine 340 in two stages. In the first stage, base formatting rules 315 can be evaluated and applied to the data objects 335 and templates 345 and composition can be performed as usual in variable data composition systems and as known in the art, i.e., data can be evaluated for each record or data object 335 and content can be formatted according to the defined rules 315. After the first stage has completed, the second stage of composition can begin. In this stage the composition engine 340 can resolve the derived rules 320 for each record or data object 335. The composition engine 340 can apply the derived rules 320 to inspect the formatting of associated or identified data objects 335 to determine which formatting is applied to another given data object 335. If matching rules 325 are defined, they can be evaluated and applied by the composition engine 340 before formatting rules 330 are evaluated and applied. The matching rules 325 can be applied to select the data objects to format after evaluating the base formatting rules 315 and derived rules 320. If the matching rules 325 also include formatting rules 330, the composition engine 340 can apply formatting to data objects 335 based on the criteria specified in the formatting rule 330. According to one embodiment, the base rules 315 can be associated with a specific template 345. The other rules 320, 325, 330 can apply to multiple templates 345. For example, derived rules 320 could be used to link formatting in a microsite and an email to formatting in an object within a postcard template. In addition, the matching and formatting rules 325 and 330 could span multiple templates 345 including templates of different types.

Once the composition engine 340 has finished applying the defined rules 315-330 using the templates 345 and data objects 335 a set of custom documents 360 is generated. It should be understood that composition in this manner can be done before or after distribution of documents. For example, for a postcard or other physical, printed document, composition can be done before printing. However, for a micro-site or an email leveraging remote content, composition could be done on-demand in response to the user opening a website or email. In either case, the output of composition when using embodiments described herein does not differ from the output of a typical variable data composition system. However, defining the rules 315-330 for variable data composition as described herein, especially the derived rules 320, matching rules 325 and formatting rules 330, is significantly less effort than when defining previous rule sets.

For example, in a previous variable data composition rule set used to produce a flyer or advertisement for a zoo directed to previous zoo visitors that includes a front page with a selectable image of a zoo animal, a customizable rectangle at the top right, a customizable rectangle at the bottom, and a customizable circle, and a back page with a customizable rectangle at the top right corner, the rules may contain or use the following information: past marketing campaign responses; exhibits visited while at the zoo; fundraisers attended; social media profile information; children ethnographic information; and parent ethnographic information. In this case, the user would define five rules, each with multiple conditions, to correlate the information in each category to an image or to a decision to use the next criteria on the list. To use the above information, the template would need 30 rules for selecting an image. To format all variable objects in the document, the template would need 150 rules, i.e., 30 rules for each of the following: front page image, front page top right corner rectangle, front page bottom rectangle, circle, and back page top right corner rectangle. If microsites and/or email were being used as part of the marketing campaign then the user would also define a similar set of rules for formatting the email and webpages related to the campaign.

However, using embodiments of the present disclosure, a user would be able to use 34 rules to format all variable objects in the document as follows: 30 standard rules for the front image (per above); one derived rule for a vector object defining a source object (image) and source object property (dominant color) with options to override lightness, ignore white, and/or ignore black; and three derived rules for other vector objects, each defining a source object (vector using above rule) and a source object property (match color). Alternatively, the user may use 31 rules as follows: 30 standard rules for the front image (per above); and one derived matching rule applied to 4 vector objects to define selected objects (vector objects), source object (image), and source object property (dominant color) with options to override lightness, ignore white, and/or ignore black. In either case, the system 300 described herein requires significantly fewer rules 315-330 to define the required variable data formatting. This makes it simpler for the user to create sophisticated variable data composition templates 345. In addition, the resultant templates 345 are simpler to maintain as there are no duplicated rules to keep in sync as the rules are updated over time. The net result if that more sophisticated variable data composition is possible with less effort and complexity. This result becomes even more apparent in the case of multiple templates. As noted above, each template can represent a different base document for a different type of communications or communication channels, e.g., a micro website, email, content pushed to mobile apps, printed material, and others. Since derived rules can be used to link formatting between templates and matching and formatting rules can span multiple templates, including templates of different types maintenance of multiple templates is significantly simplified.

Figure 4:
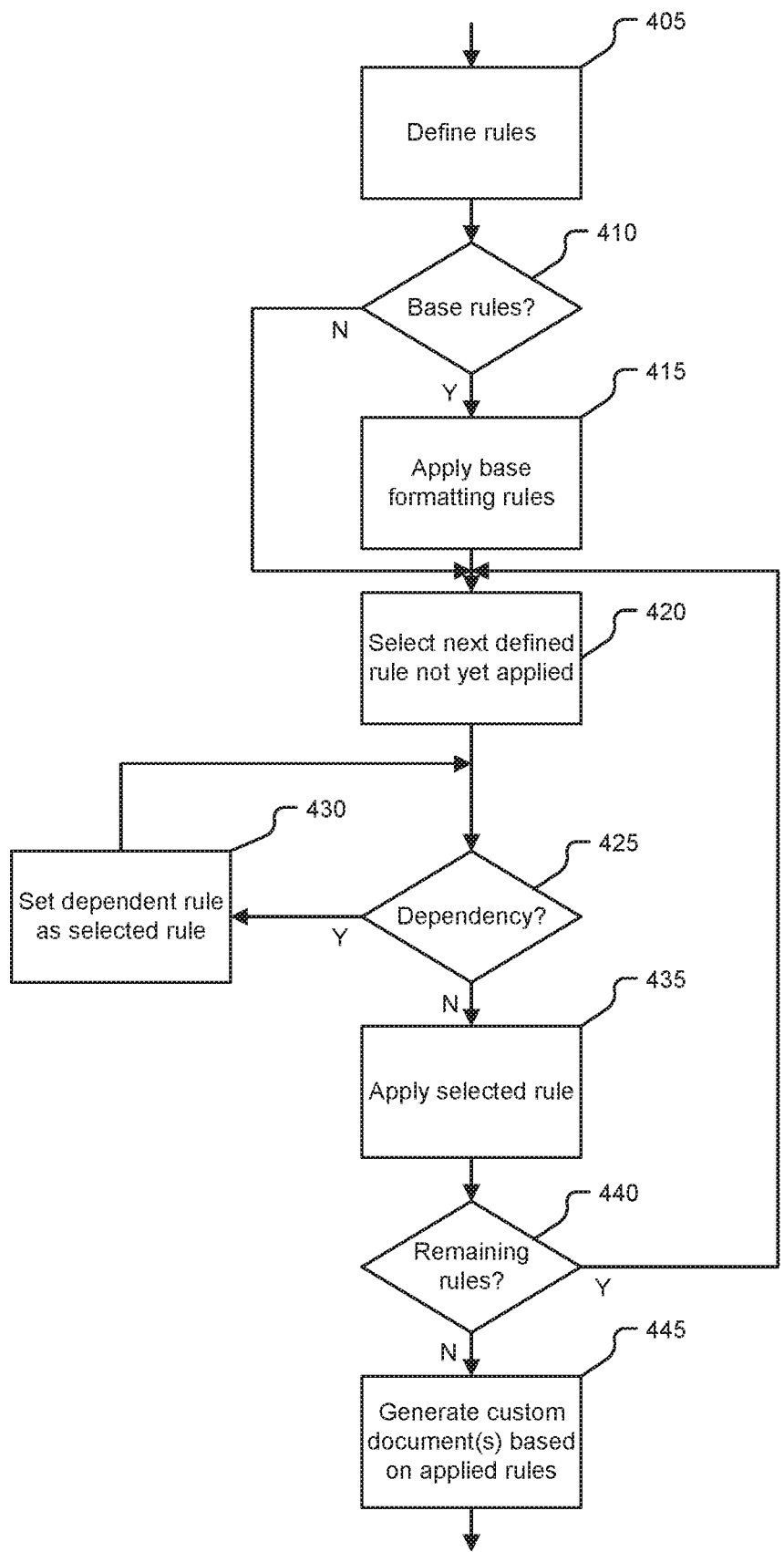
FIG. 4 is flowchart illustrating an exemplary process for formatting variable data production of a document according to one embodiment of the present disclosure.

FIG. 4 is flowchart illustrating an exemplary process for formatting variable data production of a document according to another embodiment of the present disclosure. At step 405, formatting variable data production of a document can begin with defining a set of rules. The set of rules can comprise one or more of a derived rule, a matching rule, or a formatting rule associated with one or more data objects of the document. In some cases, the set of rules can further comprise at least one base formatting rule for the document. At step 410, when the set of rules is applied, a determination can be made as to whether a base formatting rule has been defined in the set of rules. At step 415, in response to determining the set of rules includes at least one base formatting rule, the base formatting rules can be applied before applying any of the derived rules, matching rules, or formatting rules.

At step 420, a first or next rule of the set of rules that has not yet been applied can be selected. At step 425, a determination can be made as to whether one or more dependencies are defined within the selected next rule. At step 435, in response to determining no dependencies are defined within the selected next rule, the selected next rule can be applied. At step 430, in response to determining one or more dependencies are defined within the selected next rule, the dependent rule can be set as the selected next defined rule and then, at step 425 another determination can be made as to whether any further dependent rules remain until the deepest dependent rule has been reached. In a set that includes at least one dependent rule, the deepest dependent rule can be considered the rule of the series which does not depend on any other rules. So for example, if Rule 1 depends on Rule 2 which further depends on Rule 3, Rule 3 would be the deepest dependent rule. At step 435, the selected next rule, i.e., the deepest remaining dependent rule, can then be applied. At step 440, a determination can be made as to whether any rules in the set of rules remain to be applied. At steps 420-440, selecting a next rule, determining whether one or more dependencies are defined within the selected next rule, selecting the deepest remaining dependent rules, if any, as the next rule, and applying the selected next rule can be repeated until all dependencies are resolved and all rules in the set of rules have been applied. In other words, if the selected rule has no dependency, it can be applied. However, if the selected rule has a dependency, then any dependent rules can be applied to resolve those dependencies. Such dependencies can be resolved by traversing the dependencies until reaching a rule that has no dependencies, and applying the rules in reverse order of that traversal until the originally selected rule can be applied. Using the example from above in which Rule 1 depends on Rule 2 which further depends on Rule 3, Rule 3 will be resolved first, followed by Rule 2 and then Rule 1.

At step 435, applying the selected rule can comprise applying at least one derived rule identifying a source object to which the at least one derived rule is associated and a property of the source object to transfer to a target object. The at least one derived rule can further identify a relationship between the source object and the target object and controls transfer of the identified property from the source object to the target object. Additionally or alternatively, the set of rules can comprise at least one matching rule identifying data objects to which the matching rule applies based on one or more properties of the data objects. In such cases, applying the at least one matching rule can comprise selecting one or more data objects to which the matching rule applies based on conditions defined in the matching rule and values for the one or more properties of the selected one or more data objects and formatting the selected one or more data objects based on actions defined in the matching rule. In other cases, the set of rules can additionally or alternatively comprise at least one formatting rule defining formatting of an associated data object based on an object type for the associated data object. In such cases, applying the at least one formatting rule can comprise selecting one or more data objects to which the formatting rule applies based on the object type defined in the formatting rule and formatting the selected one or more data objects based on actions defined in the formatting rule. At step 445 one or more custom documents can be generated based on the applied set of rules.

The present disclosure, in various aspects, embodiments, and/or configurations, includes components, methods, processes, systems, and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for formatting variable data production of a document, the method comprising:

defining, by a document production system, a set of rules, the set of rules comprising one or more of a derived rule, a matching rule, or a formatting rule associated with one or more data objects of the document;

applying, by the document production system, the set of rules to the associated one or more data objects of the document based on dependencies between the rules in the set of rules, wherein the dependencies between the rules in the set of rules are resolved in a hierarchically vertical manner, wherein applying the set of rules to the associated one or more data objects of the document based on dependencies between the rules in the set of rules and resolving the dependencies between the rules in the set of rules are resolved in a hierarchically vertical manner comprises:

selecting from the set of rules a next rule that has not yet been applied, determining whether one or more dependencies are defined within the selected next rule in response to determining no dependencies are defined within the selected next rule, applying the selected next rule, in response to determining one or more dependencies are defined within the selected next rule, setting a deepest remaining dependent rule as the selected next rule, and applying the selected next rule, and repeating said selecting a next rule, determining whether one or more dependencies are defined within the selected next rule, setting the deepest remaining dependent rule, if any, as the selected next rule and applying the selected next rule until all dependencies are resolved and all rules in the set of rules have been applied; and generating, by the document production system, one or more custom documents based on the applied set of rules.

2. The method of claim 1, wherein the set of rules further comprises at least one base formatting rule for the document, wherein the at least one base formatting rule comprises an executable statement that defines formatting properties for specific objects within the document, the formatting properties comprising one or more of font properties, paragraph properties, fill properties, stroke properties, or image properties, and wherein applying the set of rules further comprises applying the at least one base formatting rule to data of the document prior to applying the set of rules to the associated one or more data objects of the document.

3. The method of claim 1, wherein the set of rules comprises at least one derived rule identifying a source object to which the at least one derived rule is associated and a property of the source object to transfer to a target object, wherein the at least one derived rule comprises an executable statement that defines formatting for the properties based on the source object, the property comprising a style property, a vector property, a text property, or an image property.

4. The method of claim 3, wherein the at least one derived rule further identifies a relationship between the source object and the target object and controls transfer of the identified property from the source object to the target object, wherein the relationship is identified as a match relationship between the source object and the target object, a numeric relationship between the source object and the target object, or a color relationship between the source object and the target object.

5. The method of claim 1, wherein the set of rules comprises at least one matching rule identifying data objects to which the matching rule applies, the at least one matching rule comprising an executable statement to select data objects based on one or more properties of the data objects.

6. The method of claim 5, wherein applying the at least one matching rule comprises selecting one or more data objects to which the matching rule applies based on conditions defined in the matching rule and values for the one or more properties of the selected one or more data objects and formatting the selected one or more data objects based on actions defined in the matching rule.

7. The method of claim 1, wherein the set of rules comprises at least one formatting rule defining formatting of an associated data object based on an object type for the associated data object.

8. The method of claim 7, wherein applying the at least one formatting rule comprises selecting one or more data objects to which the formatting rule applies based on the object type defined in the formatting rule and formatting the selected one or more data objects based on actions defined in the formatting rule.

9. A system comprising:
a processor; and
a memory coupled with and readable by the processor and storing therein a set of instructions which, when executed by the processor, causes the processor to format variable data production of a document by:

defining a set of rules, the set of rules comprising one or more of a derived rule, a matching rule, or a formatting rule associated with one or more data objects of the document;

applying the set of rules to the associated one or more data objects of the document based on dependencies between the rules in the set of rules, wherein the dependencies between the rules in the set of rules are resolved in a hierarchically vertical manner, wherein applying the set of rules to the associated one or more data objects of the document based on dependencies between the rules in the set of rules and resolving the dependencies between the rules in the set of rules are resolved in a hierarchically vertical manner comprises:

selecting from the set of rules a next rule that has not yet been applied, determining whether one or more dependencies are defined within the selected next rule, in response to determining no dependencies are defined within the selected next rule, applying the selected next rule, in response to determining one or more dependencies are defined within the selected next rule, setting a deepest remaining dependent rule as the selected next rule, and applying the selected next rule, and repeating said selecting a next rule, determining whether one or more dependencies are defined within the selected next rule, setting the deepest remaining dependent rule, if any, as the selected next rule and applying the selected next rule until all dependencies are resolved and all rules in the set of rules have been applied;

generating one or more custom documents based on the applied set of rules.

10. The system of claim 9, wherein the set of rules comprises at least one derived rule identifying a source object to which the at least one derived rule is associated and a property of the source object to transfer to a target object, wherein the at least one derived rule comprises an executable statement that defines formatting for the properties based on the source object, the property comprising a style property, a vector property, a text property, or an image property.

11. The system of claim 10, wherein the at least one derived rule further identifies a relationship between the source object and the target object and controls transfer of the identified property from the source object to the target object, wherein the relationship is identified as a match relationship between the source object and the target object, a numeric relationship between the source object and the target object, or a color relationship between the source object and the target object.

12. The system of claim 9, wherein the set of rules comprises at least one matching rule identifying data objects to which the matching rule applies, the at least one matching rule comprising an executable statement to select data objects based on one or more properties of the data objects and wherein applying the at least one matching rule comprises selecting one or more data objects to which the matching rule applies based on conditions defined in the matching rule and values for the one or more properties of the selected one or more data objects and formatting the selected one or more data objects based on actions defined in the matching rule.

13. The system of claim 9, wherein the set of rules comprises at least one formatting rule defining formatting of an associated data object based on an object type for the associated data object and wherein applying the at least one formatting rule comprises selecting one or more data objects to which the formatting rule applies based on the object type defined in the formatting rule and formatting the selected one or more data objects based on actions defined in the formatting rule.

14. A non-transitory, computer-readable medium comprising a set of instructions stored therein which, when executed by a processor, causes the processor to format variable data production of a document by:
   defining a set of rules, the set of rules comprising one or more of a derived rule, a matching rule, or a formatting rule associated with one or more data objects of the document;
   applying the set of rules to the associated one or more data objects of the document based on dependencies between the rules in the set of rules, wherein the dependencies between the rules in the set of rules are resolved in a hierarchically vertical manner, wherein applying the set of rules to the associated one or more data objects of the document based on dependencies between the rules in the set of rules and resolving the dependencies between the rules in the set of rules are resolved in a hierarchically vertical manner comprises:
      selecting from the set of rules a next rule that has not yet been applied,
      determining whether one or more dependencies are defined within the selected next rule,
      in response to determining no dependencies are defined within the selected next rule, applying the selected next rule,
      in response to determining one or more dependencies are defined within the selected next rule, setting a deepest remaining dependent rule as the selected next rule, and applying the selected next rule, and
      repeating said selecting a next rule, determining whether one or more dependencies are defined within the selected next rule, setting the deepest remaining dependent rule, if any, as the selected next rule and applying the selected next rule until all dependencies are resolved and all rules in the set of rules have been applied; and
   generating one or more custom documents based on the applied set of rules.

15. The non-transitory, computer-readable medium of claim 14, wherein the set of rules comprises at least one derived rule identifying a source object to which the at least one derived rule is associated and a property of the source object to transfer to a target object, wherein the at least one derived rule comprises an executable statement that defines formatting for the properties based on the source object, the property comprising a style property, a vector property, a text property, or an image property and wherein the at least one derived rule further identifies a relationship between the source object and the target object and controls transfer of the identified property from the source object to the target object, wherein the relationship is identified as a match relationship between the source object and the target object, a numeric relationship between the source object and the target object, or a color relationship between the source object and the target object.

16. The non-transitory, computer-readable medium of claim 14, wherein the set of rules comprises at least one matching rule identifying data objects to which the matching rule applies, the at least one matching rule comprising an executable statement to select data objects based on one or more properties of the data objects and wherein applying the at least one matching rule comprises selecting one or more data objects to which the matching rule applies based on conditions defined in the matching rule and values for the one or more properties of the selected one or more data objects and formatting the selected one or more data objects based on actions defined in the matching rule.

17. The non-transitory, computer-readable medium of claim 14, wherein the set of rules comprises at least one formatting rule defining formatting of an associated data object based on an object type for the associated data object and wherein applying the at least one formatting rule comprises selecting one or more data objects to which the formatting rule applies based on the object type defined in the formatting rule and formatting the selected one or more data objects based on actions defined in the formatting rule.

* * * * *